United States Patent
Voss et al.

(10) Patent No.: US 6,701,597 B2
(45) Date of Patent: Mar. 9, 2004

(54) METHOD FOR FORCE-TRANSMITTING CLAMPING OF A TOOL

(75) Inventors: Michael Voss, Leonberg (DE); Olaf Sandkuehler, Stuttgart (DE)

(73) Assignee: Bilz Werkzeugfabrik GmbH Co. KG, Ostfildern (DE)

( * ) Notice: Subject to any disclaimer, the term of this patent is extended or adjusted under 35 U.S.C. 154(b) by 0 days.

(21) Appl. No.: 10/414,716

(22) Filed: Apr. 16, 2003

(65) Prior Publication Data

US 2003/0192161 A1 Oct. 16, 2003

Related U.S. Application Data

(62) Division of application No. 09/860,162, filed on May 17, 2001, now Pat. No. 6,588,083.

(30) Foreign Application Priority Data

May 19, 2000 (DE) .......................................... 100 24 423

(51) Int. Cl.$^7$ .............................................. B23Q 17/00
(52) U.S. Cl. ...................... 29/407.05; 29/447; 29/800; 408/239 R; 409/232
(58) Field of Search ....................... 29/447, 800, 408.08, 29/407.1, 407.05, 407.04; 285/381.1; 403/273; 279/143; 408/226, 238, 239 R, 239 A; 409/232, 234

(56) References Cited

U.S. PATENT DOCUMENTS

| | | | |
|---|---|---|---|
| 5,280,671 A | * | 1/1994 | Marquart ....................... 29/447 |
| 5,311,654 A | * | 5/1994 | Cook ........................... 29/447 |
| 5,582,494 A | * | 12/1996 | Cook ........................... 409/234 |
| 5,992,860 A | * | 11/1999 | Marquart ..................... 403/273 |

FOREIGN PATENT DOCUMENTS

| | | | |
|---|---|---|---|
| DE | 297 16 051 | * | 2/1998 |
| DE | 100 15 322 | * | 10/2001 |
| DE | 100 25 007 | * | 11/2001 |
| JP | 4-129605 | * | 4/1992 |
| JP | 2001-62638 | * | 3/2001 |
| JP | 2001-150213 | * | 6/2001 |
| JP | 2001-179544 | * | 7/2001 |

OTHER PUBLICATIONS

Martin Eastman, "Shrink–Fit Toolholding," Apr. 1997, Cutting Tool Engineering, vol. 49, No. 3.*
Herbert Schultz and Eckehard Kalhoefer, "Now also Shrink–Clamping of Steel Shanks," Sep. 1996, Werkstatt Und Betrieb.*
Herbert Schultz and Uwe Ronde, "Shrink–Clamping of Tools," Nov. 1994, Werkstatt Und Betrieb.*

* cited by examiner

*Primary Examiner*—David P. Bryant
(74) *Attorney, Agent, or Firm*—Michael J. Striker

(57) ABSTRACT

Form-transmitting clamping of a tool with a shaft in an opening of the tool receptacle by shrinking with heating and cooling and adjustment of an axial insertion depth of a shaft in an opening of the tool receptacle, the method includes placing a movable contact piece on a free end of a tool for positioning the tool coaxially to the tool receptacle, clamping the tool between the contact piece on the one hand and a counterforce which acts opposite on the tool and oppositely to an insertion of the tool in the opening of the tool receptacle on the other hand before starting a heating, retaining the shaft clamped during the heating, and stopping the heating after reaching a predetermined nominal value during insertion of the shaft in the opening of the tool receptacle.

2 Claims, 5 Drawing Sheets

METHOD FOR FORCE-TRANSMITTING CLAMPING OF A TOOL

This is a divisional application of U.S. Ser. No. 09/860,162, filed May 17, 2001, now U.S. Pat. No. 6,588,083.

BACKGROUND OF THE INVENTION

The present invention relates to a method of force-transmitting clamping of a tool, in particular with a shaft in an opening of a tool receptacle by shrinking including heating and cooling, wherein the axial insertion depth of the shaft in the opening is provided by an adjustment.

In this method the heating is preferably performed inductively. In the method with thermal clamping of tools, a high-precise mounting of the tools, for example drills, mills and the like is obtained. The tool receptacle is heated at least in the region of a sleeve part which contains the opening so that the opening is increased. The tool is inserted with its shaft in the thusly increased opening. During subsequent cooling the shaft of the tool is forced-transmittingly held in the opening of the tool receptacle which is shrunk by cooling. The diameter of the opening of the tool receptacle and the shaft of the tool are selected so that during cooling a force-transmitting (force-locking) and non rotatable connection is produced, such that during fast rotation it is not released under the action of centrifugal forces. In order to remove the tool, the tool receptacle is again heated, and the opening is enlarged until the tool with its shaft can be withdrawn from the tool receptacle. The withdrawal is possible since the heating propagates from outside inwardly, so that first for example the sleeve part of the tool receptacle is heated up, before the heat reaches the shaft of the tool which is clamped in the receptacle. Thereby the sleeve portion is first expanded, so that the still cold shaft of the tool can be released during unchanging from the opening.

During the clamping of the shaft of the tool, the axial insertion depth of the shaft can be exactly adjusted in the opening of the tool receptacle, also with consideration of certain circumstances that during the subsequent cooling a length change will occur. It is known for clamping a tool, first to heat the tool receptacle until its opening is increased so that subsequently the tool with its shaft can be inserted into the opening. The insertion depth in the insertion is selected in correspondence with an assumption that an abutment which is integrated in the tool receptacle can be additionally provided. The insertion and the adjustment of the insertion depth are performed in heated condition of the tool receptacle with inwardly propagating terminal expansion of the inner receiving opening. This method operates only when during the short heating phase a sufficient time is available and when the tool is used with low thermal expansion, such as for example of hard metal or ceramic, since with these tool materials one must not be afraid that the heat supplied to the tool receptacle can be transferred to the tool shaft and cause its expansion and clamping during the insertion.

It is further known to adjust first an adjustment screw which is coaxially held in the tool receptacle, by means of an adaptor inserted in the opening of the tool receptacle in its cold condition, with respect to the axial nominal position. The adjustment can be performed by contacting or optical measurement, for example of the tip of the tool. After the complete adjustment of the coaxial adjustment screw and removal of the adaptor, the shrinking of the tool is performed by its shaft. During heating of the enlarged opening of the tool receptacle the tool can be inserted with its shaft so far until the end side of the shaft which is opposite to the tool tip axially abuts against the adjustment screw. The adjustment in this manner is not very accurate. Inaccuracies occur within the range of +/−0.05 mm. This inaccuracy results from the fact that the tool, with respect to the above mentioned end side which reaches the contact with the adjusting screw, is not accurately treated. Also, the arrangement of the adjusting screw which is screwed in the central threaded opening coaxially to the opening is an additional expense, and also the thread pitch can cause additional adjustment errors.

SUMMARY OF THE INVENTION

Accordingly, it is an object of the present invention to provide a method of the above mentioned general type, which avoids the disadvantages of the prior art.

More particularly, it is an object of the present invention to provide a method of the above mentioned general type, which provides a very precise adjustment of the insertion depth of the tool with a simplified structural expenses of the tool receptacle.

It is also an object of present invention to provide a method of the above mentioned general type, which does not have any limitations with respect to the material pair tool receptacles/tool.

It is a further object of the present invention to provide a method of the above mentioned general type, in which not only tools with low thermal expansion can be utilized, such as hard metal, ceramic and the like, but also tools composed of other materials can be used as well.

In keeping with these objects and with others which will become apparent hereinafter, one feature of present invention resides, briefly stated in a method of the above mentioned general type, in which with the tool coaxially supported relative the tool receptacle, for positioning of the tool a movable contact piece is arranged at its free end for abutment, and the tool is clamped between the contact piece at one side and a counterforce on the other side which acts on the tool in an opposite direction and opposite to an insertion into an opening of a tool receptacle before the heating starts, and during the heating it remains clamped, so that after reaching a predetermined nominal value during insertion of the shaft into the opening of the receptacle it is stopped.

In the inventive method the adjusting of the insertion depth of the tool shaft in the tool receptacle is performed before the heating of the tool receptacle. After the dimension reference, the relevant cutting geometry and not the end-side rear side of the tool shaft is utilized, and therefore a high quality exact adjustment is possible. With respect to the apparatus expenses, in particular the design of the tool receptacle, a simplifcation is provided because an inner adjusting screw with a threaded opening for receiving the same can be dispensed with and therefore the tool receptacle is simpler and less costly, and the danger of a pretensioning of mechanical parts is also eliminated. Before the heating of the tool receptacle, the movable contact piece is placed on the free end of the tool in abutment, so that the tool activates an oppositely directed, also coaxial, loading counterforce, and the tool can be held axially between the contact piece and the counterforce.

When the heating of the tool receptacle is performed with the opening of the tool receptacle increased due to the warning, the tool penetrates with its shaft into the larger opening of the tool receptacle. This insertion movement is performed because of the vertical arrangement under the action of the gravity forces. It can be also performed with the vertical arrangement and also with another spacial orientation of the arrangement manually and/or by driven means and/or by an adjustment drive, etc. The insertion of the tool clamped in the above mentioned manner, into the opening of the tool receptacle is stopped when the nominal value provided by adjustment is achieved. This stopping can be obtained by mechanical abutting against an abutment or in a similar way. When subsequently the heating is stopped, the tool receptacle is cooled and the tool shaft is clamped in a force-transmitting manner in the opening which is shrunk by cooling.

The method in accordance with the present invention is applicable equally for tools with low thermal expansion and for tools with high thermal expansion, so that both the tools of hard metal, ceramic and the like as well as tools composed for example of tool steel can be utilized. It should be taken into consideration that the heating phase is very short and as a rule is only approximately 5–10 seconds, and the adjustment of the tool together with a tool receptacle during insertion in the latter is performed during this short time period and simultaneously with the insertion in the opening of the tool receptacle, and so that it is not necessary to provide on the tool or the tool shaft mechanical clamping assisting means or the like.

In accordance with an advantageous embodiment of the present invention, the reaching of a predetermined nominal value is performed during insertion of the shaft in the opening by a mechanical abutment which is adjusted to a predetermined nominal value and is fixed, and is associated with the contact piece, in particular a movable holder of the contact piece. During insertion of the shaft into the opening the insertion path is limited by abutting against this abutment.

In accordance with another advantageous feature of present invention, the tool is brought with its shaft into an abutment opening of an abutment which is coaxially centered to a free end of the opening of the tool receptacle, in particular of the tool receptacle. The tool receptacle is located in not heated condition, the holder with its contact piece is placed on the tool, the counterforce acts on the tool opposite to the penetration into the opening of the tool receptacle, and thereby the clamping of the tool is activated between the contact piece and the counterforce. After this the heating of the tool receptacle starts with simultaneous axial insertion of the tool with the shaft into the opening of the tool receptacle so far until the holder abuts against the abutment. Thereafter the heating of the tool receptacle is stopped and after cooling the action of the counterforce is removed. The counterforce guarantees that the tool under the action of force of gravity is not introduced beyond the predetermined insertion depth into the opening of the tool receptacle. After cooling of the tool receptacle with the simultaneous shrinking of the opening and the clamping of the tool shaft, the action of the counterforce is eliminated.

It is also advantageous when the position of the contact piece which is placed on the tool, relative to the holder and in this way the position of the holder relative to the abutment is adjusted, preferably finely adjusted before the heating of the tool receptacle. For facilitating and reaching greater accuracy, an optical measuring system can be held on the holder with an acceleration device, a receiving device, an image screen with increased reproduction of the receiving region. Here by adjustment of the contact piece placed of the tool relative to the holder with the measuring system, an adjustment of the optical measuring system with optical scanning of a predetermined reference geometry of the tool is performed. For example, sensing of the tip of a drill, the highest cutting edge of a mill, the first or second stage of a stepped tool or a scanning of another dimension-determined edge of the tool are performed. By adjustment of the contact piece which is supported on the tip of the tool, the holder and thereby the optical system can be adjusted relative to the tool so that during further insertion of the tool in the opening of the tool receptacle the holder, by abutment against the abutment adjusted to the predetermined nominal value, limits the insertion depth of the tool from above, while a further deeper penetration of the tool in the opening is prevented by the counterforce which acts in an opposite direction. It is advantageous when the abutment is adjusted with respect to dimensional representation, for example a scale for adjustment of the nominal value, in particular for fine adjustment. Therefore in its adjusted position it is fixed relative to the dimensional representation, for example clamped, and in this position forms a mechanical abutment for the holder of the contact piece, or in some cases also the optical measuring system located on it.

It is also advantageous when during an axial insertion of this shaft of the tool in the opening of the tool receptacle, the nominal dimension is obtained, in particular during abutment of the holder against the abutment, and an electrical switch contact is closed so that the supply of electrical energy for heating of the tool receptacle is interpreted. This switch contact in a simple manner can be a component of the abutment and/or of the holder which contacts it, or is formed by it directly.

It is especially advantageous when at least the region of the contact piece which is brought into contact with the tool, for example its tip, edge, etc. is formed of such a material which is yieldable when compared with a material of the tool, for example softer. Such a material can be rubber, synthetic plastic or similar spring-elastic material, or instead a part of the contact piece can be biased by a spring. It is thereby guaranteed that during placement of the contact piece on the free end of the tool for example the tool piece, the tool which is sensitive in this situation is not damaged or is not negatively influenced in another way.

The counterforce which acts opposite to the insertion of the tool shaft in the opening can be produced, depending on the design of the tool and/or of the tool receptacle, in a mechanical manner, for example by an abutment, a gripper and the like, and transmitted to the tool. With such tools which are clamped with its whole shaft or are designed differently-with respect to the geometry and with which it is not possible to engage mechanically or to act on them mechanically by the counterforce, it is especially advantageous when the counterforce is produced by a pressure gas cushion. It is advantageous to maintain the pressure gas cushion so long until, after ending the heating of the tool receptacle it is cooled during a subsequent holding time.

For producing the pressure gas cushion in the interior of the opening of the tool receptacle, it can be advantageous when in the opening of the tool receptacle, for example in the cooling medium passage provided in it, a pressure gas for example a pressure air is introduced. For loading such tool in the same way with a counterforce, which has inner cooling medium passages, it can be advantageous when for producing the pressure gas cushion in this case a regulation of the volume stream of the pressure gas, for example by a throttling, is performed until required gas pressure is reached. It is further advantageous when the magnitude of the counterforce, in particular of the pressure gas cushion is adjusted so that it is equal or greater than the opposite gravity force of a tool received in the opening of the tool receptacle. Then with for example the electrical arrangement of the tool receptacle with the opening and the vertical penetrating shaft of the tool in the opening, the gravity force of the tool acts in the vertical direction. Before reaching of the predetermined nominal value and before reaching a corresponding adjusted abutment, on which during this vertical insertion movement the holder with the contact piece can act, additionally the gravity force of the tool, in particular the weight force of the holder partially acts. The sum of these weight forces, which however must but not required, can be taken by the counterforce, since after reaching the nominal value and thereby abutment of the holder against the abutment, the gravity force of the abutment is taken with the contact piece and the parts sitting on the holder before the abutment, and thereby the contact force is taken only by the gravity force of the tool.

It can be further advantageous when the magnitude of the counterforce is varied in correspondence having the tool with different geometry. For example for providing such an adjustment the weight of the corresponding tool can be determined by weighing in a weighing device, and the magnitude of the counterforce can be determined correspondingly and thereby applied. For example, in this way it can be realized that before the insertion of the tool in the supporting opening of the tool receptacle, first the weight of the tool receptacle and of the support of the same are determined. In a subsequent weighing process with the tool inserted in the abutment opening of the tool receptacle the weight of the above mentioned part together with the tool is determined by weighing and the difference provides a pure tool weight. Such an adaptation of the magnitude of the counterforce to different tool geometries is advantageous, when a predetermined value of the tool for the pressure gas cushion is not sufficient for all tool geometries.

It is further advantageous when the holder is moved with the contact piece by gravity force and/or manually and/or by driven means and/or by an adjustment drive. Thereby a movement which does not follow the gravity force is performed and has the advantage when the penetration of the shaft of the tool holder in the opening of the tool receptacle is performed not in a vertical direction, but instead in any direction which is transversed to it for example with horizontal arrangement and horizontal insertion of the tool. It is further advantageous when the movement of the holder is performed so that the contact piece performs a linear movement substantially coaxially or parallel to the longitudinal axis of the tool and/or transversely to it.

In accordance with a further embodiment of the method of the invention, the holder and the adjustable abutment are coupled with one another or are couplable with one another, so that during movement of the holder for example in both movement directions, the adjustment of the abutment can be performed. This has the advantage that the abutment does not need its own adjusting drive or the like, but instead a gravity force acting on the holder of the light means or adjustment drive without manual actuation is engaged. For example, a coupling between the holder and the abutment can be performed by a magnetic force in one direction so that, the abutment during movement of the holder in one direction is taken by a magnetic force, and during movement of the holder in the opposite direction can be taken by means of a form-locking contact, for example by abutment.

In accordance with another embodiment of the present invention, the tool with its shaft is insertable into a supporting opening of a support which is coaxially centered to a free end of a opening of a tool receptacle, and the tool receptacle is located in a not heated condition. Then a movable holder with a contact piece on an end of a tool is placed, and the position of the contact piece on the tool is adjusted preferably in a fine manner. Thereafter the opposite end of the tool is sensed with a measuring member opposite to the penetration of the tool into the opening of the tool receptacle, and this position of the measuring member is fixed.

This adjusting method has an advantage when it is not possible to load the lower end of the tool with a contact force, such as a pressure gas cushion. In this method first the holder with the contact piece and an upper abutment is moved until the contact piece contacts an end of a tool cutting edge provided on the tool. When this contact piece for example is composed of one micrometer is adjusted, the cutting edge of the tool is oriented in accordance with the thread cross of the optical measuring system, for example a profile projector. This optical measuring system, in accordance with the profile projector measures the height of the cutting edge of the tool. At the end the measuring member moves with its contact surface oppositely from below against the facing lower end side of the tool and senses the latter. This lower measuring member is adjusted in this manner and its function is controlled by a software.

Starting from the position of the optical measuring system, for example the profile projector, the software calculates the required adjusting path for the lower measuring signal to adjust the tool to the nominal value. Hereafter the lower measuring member is adjusted to its nominal position, whereby the end surface of the measuring member assumes the nominal abutment position for the associated lower end side of the tool. Then the tool is shrunk, and the tool is moved downwardly in the opening of the tool receptacle until its end side abuts against the facing end surface of the lower measuring member and thereby the axial nominal position is reached. Since the tool in these adjustment processes maintains its axial relative rotary position and the end surface which faces the lower end of the tool is not displaced, the adjustment of the lower measuring member leads to nominal abutment adjustment without errors.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
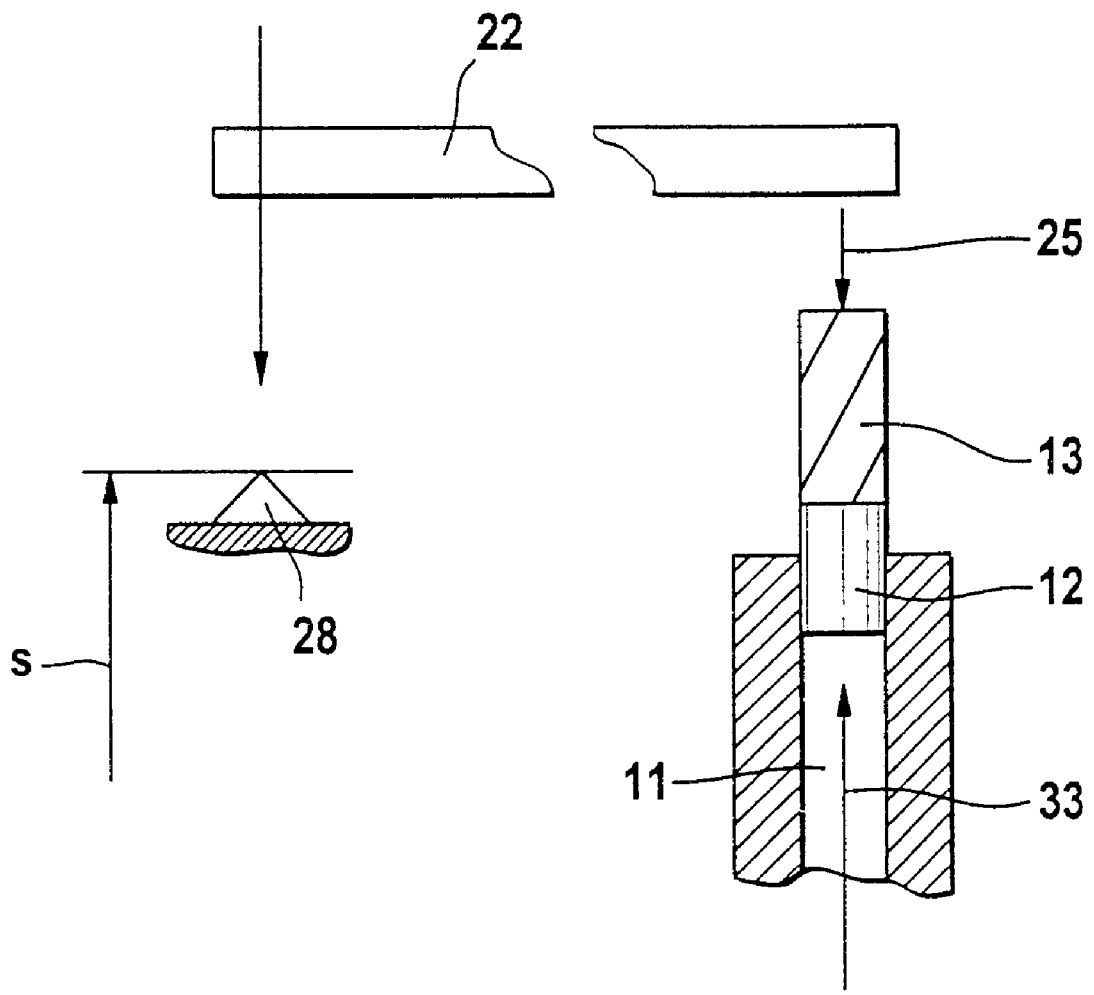
FIG. 1 is a schematic side view of a first embodiment of the present invention with a schematic representation of individual device points.

The drawings schematically show a tool receptacle 10 with an opening 11 for receiving a cylindrical shaft 12 of a tool 13. The tool receptacle 10 can be formed as any component, for example a spindle portion, a part of a chuck, an adaptor or the like. The tool can also be any tool, for example a drill, a thread drill, a mill, a stepped stool, and the like. The opening 11 in the tool receptacle 10 can be opened downwardly. It can be provided at its free end with a abutment opening 14 which is coaxially centered to the opening 11 for the coaxial abutment of the tool 13 before shrinking. The abutment opening 14 has a greater diameter than the opening 11, so that in a cold condition of the tool receptacle the tool 13 can be received with the end of the shaft 12 in the abutment opening 14 and retained in a centered manner, and also supported from below coaxially against displacement.

Figure 2:
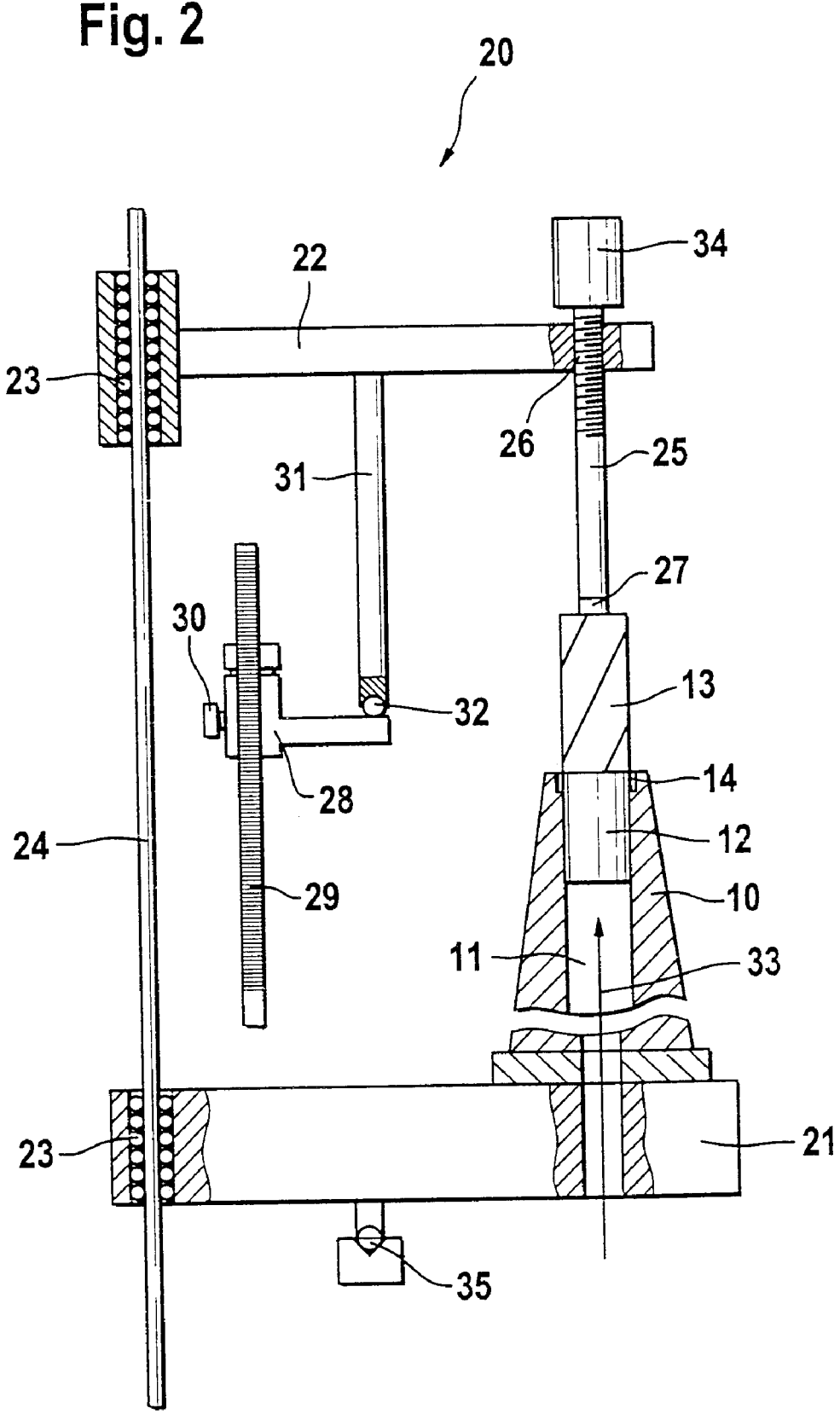
FIG. 2 is a partially sectioned schematic side view of a device in accordance with a first embodiment for performing the method.

A device 20 is provided for performing the method for force-transmitting (force-locking) clamping of the tool 10 with its shaft 12 in the opening 11 of the tool receptacle 10 by shrinking by means of heating and cooling of the same. The device has a carrier 21 for receiving the tool receptacle 10 and a holder 22 located at a distance above the carrier 21. Both parts are held and screwable by a spherical sleeve 23 on a vertical guide 24, for example a guiding rod, and can be adjustably guided when needed. The holder 22 is a carrier of a schematically shown contact piece 25, which in the embodiment of FIG. 2 is not adjustable. It also can be adjusted and finely adjusted by a thread 26 relative to the holder 22.

The contact piece 24 is movable relative to the receptacle 10 at least vertically. It can be brought from above into abutment against the free end of the tool 13, for example against its tip, cutting edge or the like, as can be seen from FIGS. 1–3. At least the region of the contact piece 25 which is brought into contact with the workpiece 13, for example its tip, cutting edge, and the like and shown in FIGS. 2 and 3 as a part 27 which is separate from the remaining part of the contact piece 25, is composed preferably of a material which is more yieldable, for example softer than the material of the tool 13. For example it can be composed of rubber, synthetic plastic or another spring-elastic material. Instead of this, the part 27 can be formed as a part which is spring-biased by a not shown spring relative to the remaining part of the contact piece 25. The device 20 also has an abutment 28 which is shown in detail in FIGS. 2 and 3. The abutment 28 is adjustable relative to a dimensional representation 29, for example a scale for adjustment of a nominal value S as shown in FIG. 1. In particular it is finely adjustable.

Figure 3:
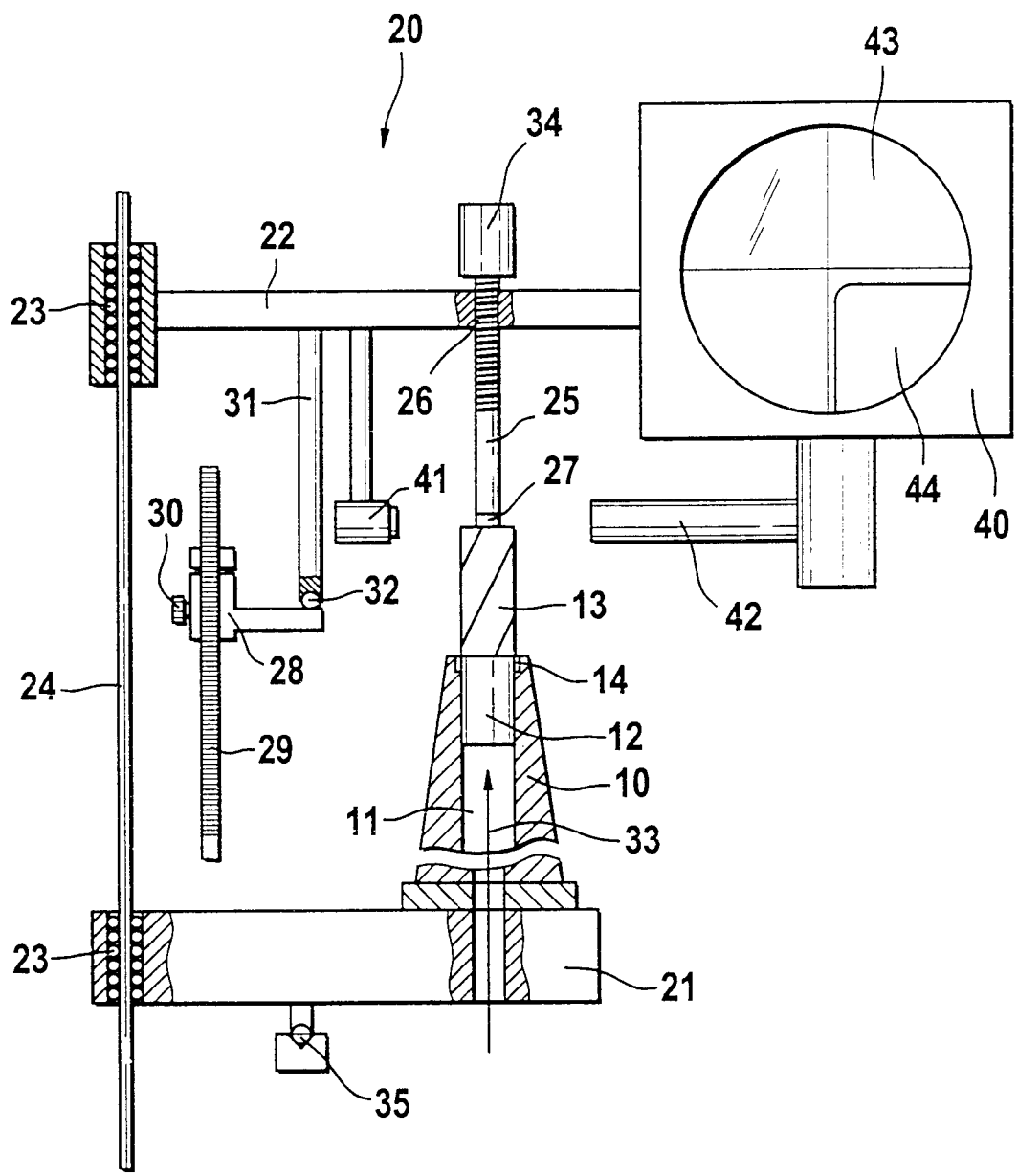
FIG. 3 is a view showing a partially sectioned schematic side view of a device in accordance with a second embodiment, for performing the method.

The adjustment 28 can be fixed in the corresponding adjusted position relative to the dimensional representation 29. For example it can be clamped by a schematically shown clamping screw 30. An electrical contact which is not shown in the drawings can be connected between the abutment 28 on the one hand and its holder 22 which is loaded in the course of adjustment from above on the other hand. The switching contact interrupts the supply of an electrical energy required for heating of the tool receptacle 10 before. The switching contact can be formed directly by the corresponding upper surfaces of the abutment 28 and/or the holder 22. In FIGS. 2 and 3 an extension 31 extends downwardly from the abutment 22 and provides a mechanical abutment of the holder 22 against the abutment 28. A ball 32 is supported at the end for the contacts. FIGS. 1–3 clearly show by an arrow 33 that during insertion and changing of the tool 13, it is loaded with a counterforce which in FIGS. 1–3 acts upwardly and opposite to the insertion of the tool 13 from above into the opening 11. The tool 13 is clamped between the contact piece 25 on the one hand, and the counterforce shown with the arrow 33 on the other hand.

In the embodiment of FIG. 2 the sensing of the upper free end of the tool 13 is performed by the contact piece 25 by placement of the same, in particular of the part 27, and the sensing. A fine adjustment of the contact piece 25 relative to the holder 22 can be performed by holding of the handle 33 and turning in the thread 26.

In the second embodiment shown in FIG. 3, the device is provided with an optical measuring system 40 which is held on the holder 22, and has a schematically shown illumination device 41, the oppositely located receiving device 42, and an image screen with increased representation of the receiving region. The optical measuring system 4 is fixedly arranged on the holder 22. During the adjustment of the contact piece 45 supported on the tool 13, the vertical position of the holder is adjusted. By relative displacement between the contact piece 25 and the holder 22 with the measuring system 40, an adjustment of the optical system 40 is performed with the optical sensing of a predetermined reference geometry of the tool 13, for example the tip of the drill, the highest cutting edge of a mill, the first or second step of a stepped tool, and the like, dimensioned-determined edge of the tool 13.

In all embodiments the holder 20 with the contact piece 25 is movable for example by force of gravity and/or by hand and/or by driven means and/or by an adjustment drive or the like. This driven means or an adjusting drive are not shown in detail, and they can be composed for example of a stepper motor. In the embodiment of FIG. 5, the enlarged view of an upper part 44 of the geometry of the tool 13 can be seen on the image screen 43.

The holder 22 can be coupled or couplable with the adjustable abutment 28, so that by adjustment movement of the holder 22 the abutment 28 can be taken along and correspondingly adjusted. During movement of the holder 22 upwardly, the abutment 24 is moved upwardly for example by a magnetic force by an extension 31 of the holder 22 until the nominal value S is adjusted. The abutment 28 is fixed by clamping, for example by a clamping screw 30 in the adjusted position. Such an opposite adjustment movement of the abutment 28 is performed for example by a form-locking contact, for example by abutment of the holder 22 directly or by means of the extension 31 in the opposite direction.

In the embodiment of FIGS. 2 and 3 the device 20 is further provided with a schematically shown weighing device 35. It has the advantage it makes possible a variation of the magnitude of the counterforce in direction of the arrow 33 for adaptation of the tool 13 with different geometry. The weighing device 35 makes possible the determination of the weight of the corresponding introduced tool 13, and to provide the magnitude of the counterforce 33 in correspondence with the weighing results. In a first step before the insertion of the tool 13 into the abutment opening 14 of the tool receptacle 10, the weight of the support 21 and the tool receptacle 20 can be first determined.

Thereafter the tool 13 with the end of the shaft 12 can be inserted from above into the tool receptacle 10 and received with the end of the shaft into the abutment opening 14, so that an axial holding and centering and an axial abutment from above is performed. In a second weighing procedure with the weighing device 35, the weight of the support 21, of the receptacle 10 and the tool 13 is determined. The weight of the tool 13 can be calculated from the difference value.

The counterforce which is represented only by the arrow 33 is introduced by a pressure gas cushion maintained inside the opening 13 of the tool receptacle 10. During adjustment and shrinking it is maintained till after the end of the heating of the tool receptacle 10 the latter is cooled during a following holding time. For producing the pressure gas cushion, a pressure gas for example a pressure air can be introduced into the opening 11 of the tool receptacle 10, for example through a passage from below or from other, not shown cooling medium passages. The magnitude of the counterforce, in particular of the pressure gas cushion, is adjusted with the advantage that it is greater than the counteracting gravity force of a tool 13 received in the opening 11 of the tool receptacle 10. The weighing device 34 and the above described weighing process are needed, and can be again used when the magnitude of the counterforce in accordance with the arrow 33 is varied in correspondence with the tools 13 with different geometry.

For a not shown tool 13 which has inner cooling medium passages through which pressure gas can escape during applying of the pressure gas cushion, a regulation of the volume stream of the pressure gas is performed for producing the pressure gas cushion. The regulations are formed for example by a throttling until a required gas pressure is obtained. Normally, the magnitude of the counterforce in accordance with the arrow 33 in particular the pressure gas cushion is adjusted so that, it is greater than the oppositely acting counterforce of a tool 13 which is received in the opening 11 of the tool receptacle 10, so that the weighing device 35 is not needed.

FIG. 4 shows in a simplified form individual steps of the inventive method. In the beginning the device 20 with its components is located in the position a. The tool receptacle 10 is introduced, for example placed on the support 21, and then the abutment 28 is adjusted to the nominal value s and fixed in the adjusted position, for example by clamping with the clamping screw 30. For this adjustment, the abutment 28 is moved upwardly in this position by a magnetic connection with the holder 22 and movement of the same, for example by means of an adjustment drive which is not shown in the drawing and formed for example as a motor.

Subsequently the tool 13 is placed from above into the tool receptacle 10. The tool 13 is centered with the lower end of its shaft 12 in their abutment opening 14 coaxially, and is axially supported. Instead of the abutment opening 14, the device 20 can have an abutment located for example above the tool receptacle 10, which in turn can have a corresponding abutment opening coaxial to the opening 11, or can act on a different holder of the tool 13 which is oriented coaxially to the opening 11 and supported against the axial downward movement. After the placement of the tool 13 which is coaxial to the tool of the receptacle 10, the contact piece 25 which is movable on its free end is brought to abutment for positioning of the tool 13, as shown in the second illustration b in FIG. 4. The drawing does not show that before this, the induction coil for inductive heating of the tool receptacle 10 is moved downwardly and placed on the tool receptacle 10. After placing of the contact piece 25 on the free end of the tool 13, the optical scanning of the tool 13 for example of its tip or its cutting edge is performed for example by the available optical system shown in FIG. 3. Then the contact force which acts on the tool 14 opposite to the insertion into the opening 11, in direction of the arrow 33 is activated. This condition is shown in FIGS. 1–3 and the illustration c in FIG. 4. The tool 13 is vertically axially clamped between the contact piece 25 which is placed from above on the one hand, and the counterforce acting from below in direction of the arrow 33 on the other hand. Finally, with the activation of this counterforce in accordance with the arrow 33, by actuating of the contact piece 25 a fine adjustment is performed when needed. The contact piece 25 is adjusted relative to the holder 22 with the measuring system 44. Since the contact piece 25 is supported on the tool 13, an adjustment of the holder 22 together with the measuring system 40 relative to the tool 13 is performed so that an adjustment of the optical measuring system 40 with the optical scanning of a predetermined reference geometry of the tool 13, for example the tip of a drill, the highest cutting edge of a mill, the first or second step of a stepped tool or similar dimension-determining edge of the tool 13 is performed. This is illustrated in the picture c of FIG. 4, for example a covering of a workpiece edge with the thread cross on the image screen 43.

After this fine adjustment the heating of the tool receptacle 10 starts by releasing the electrical energy for the not shown induction coil. The thusly introduced warming up of the tool receptacle 10 results in an enlargement of the opening 11 so that with the vertical arrangement the tool 13 can be inserted in the opening 11 and can move downwardly. The gravity forces of the holder 22 with all parts arranged on it acts on the tool 13 and the gravity force of the tool 13 is also active. The counterforce 33 also acts oppositely. In the short heating phase of 5–10 seconds, the shaft 12 of the tool 13 moves deeper into the opening 11 to the predetermined nominal value s, for example by abutting of the holder 22 against the abutment 28. A further sliding of the shaft 12 of the opening 11 is prevented by the counterforce 33. After the abutment against the abutment 28 and reaching the nominal value the heating is stopped. For example, an electrical switch contact interrupts the supply of the electrical energy into the induction coil. After a certain holding time which is sufficient for cooling of the tool receptacle 10 so that the opening 11 shrinks and the shaft is clamped in force-transmitting manner, the counterforce in accordance with the arrow 33 is removed. Thereafter the holder 22 can move upwardly, with the components located on it in an opposite direction and also the not shown induction coil, and then the tool receptacle with the tool 13 clamped by shrinking can be removed, and supplied to a cooling station for cooling to room temperature.

Figure 4A:
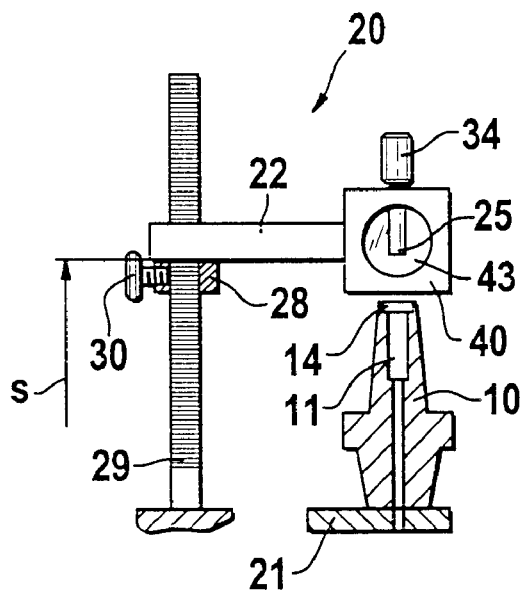
FIG. 4 is a schematic partially sectioned side view of the individual device locations in different stages during performing individual steps of the method in accordance with the present invention.
Figure 4B:
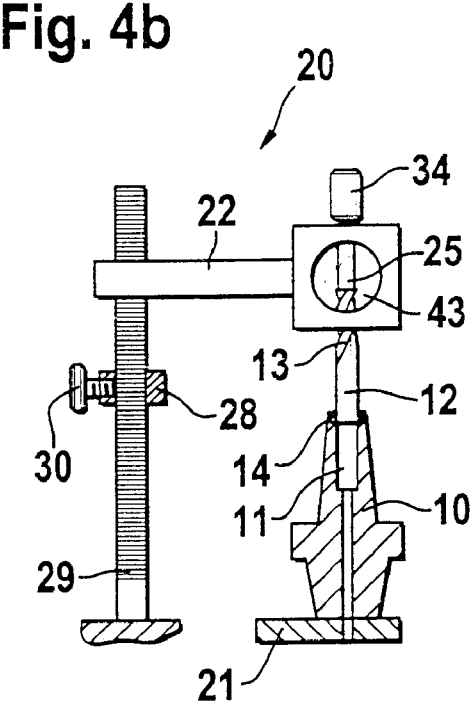
Figure 4C:
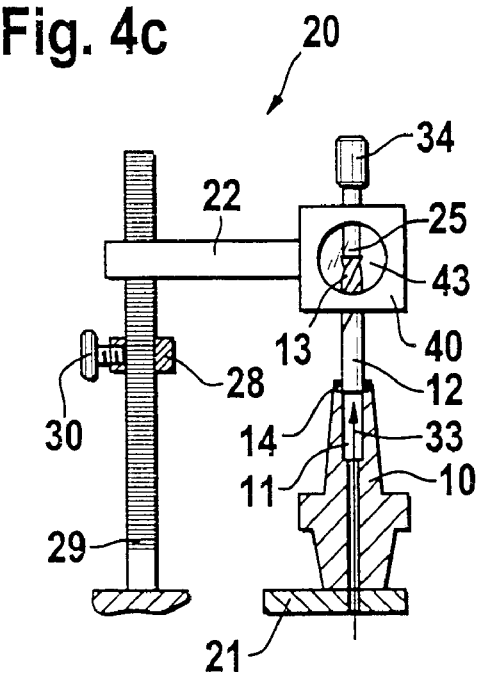
Figure 4D:
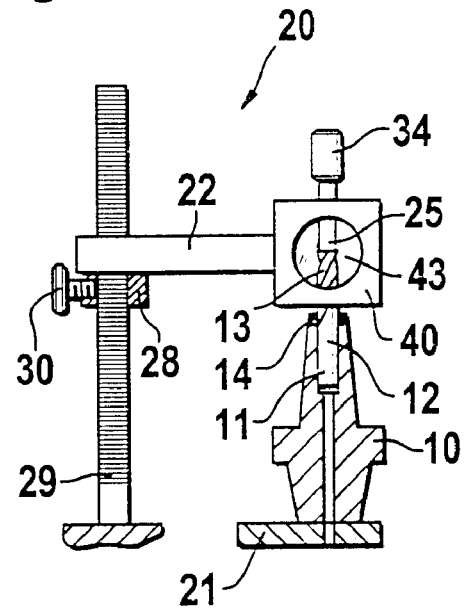

FIGS. 5a–5e show another embodiment of the inventive method which is analogous to the embodiments of FIGS. 4a–4b. Here the parts which are identical to the parts in the first embodiment are identified with the same reference numerals to avoid repetition of the description.

In the second embodiment, the nominal position of the tool shaft 12 which is shrunk in the tool receptacle 10 and of the tool 13 is provided by a lower abutment in the drawings, formed as a measuring member 50. It can be composed for example as a micrometer screw. The abutment is provided by the end surface 51 of the adjustable part of the measuring member 50.

Figure 5A:
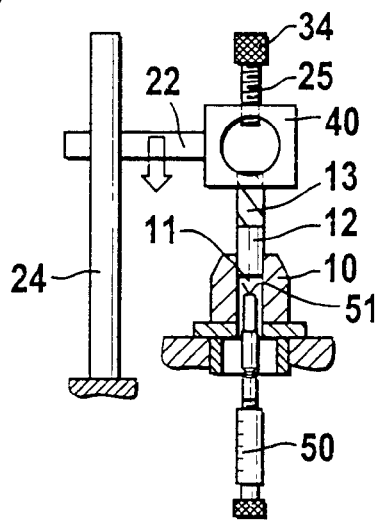
FIG. 5 is a schematic, partially sectioned side view of individual device locations in different stages during performing individual steps of the method in accordance with a second embodiment of the present invention.
Figure 5B:
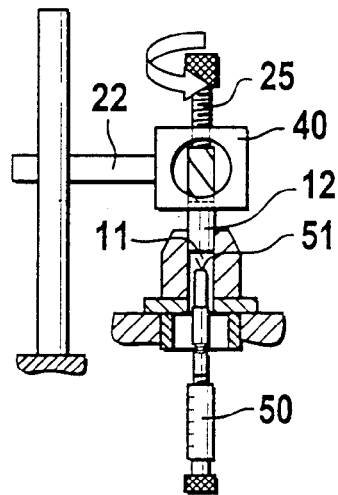
Figure 5C:
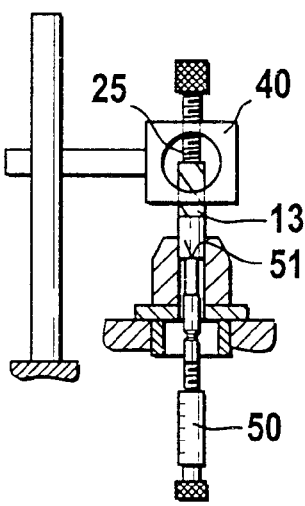
Figure 5D:
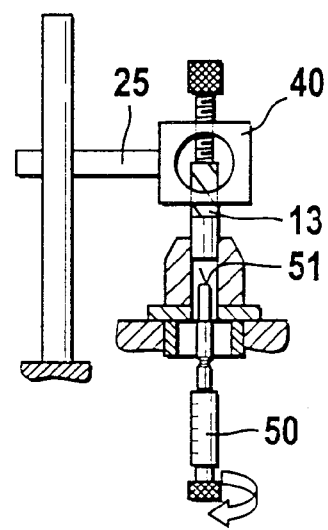
Figure 5E:
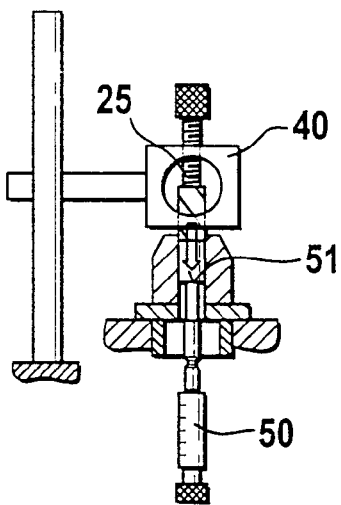

As in the first embodiment, in FIG. 5a the tool 13 with the shaft 12 is inserted in the opening 11 of the tool receptacle 10. The optical measuring system 40, in particular a profile projector, is moved downwardly along the guide 24 until a contact piece 25 with its contact surface abuts against the cutting edge of the tool 13. This contact piece 25, for example a micrometer screw, is adjusted relative to the measuring system 40 in particular finely, and thereby the cutting edge of the tool 13 is oriented in accordance with a thread cross of the measuring system 40, in particular the profile projector. The measuring system 40, in particular the profile projector, measures the height of the cutting edge of the tool 13. This condition is shown in FIG. 5b. Finally a measuring member 50 which is shown in the drawings from below, for example a micrometer screw, is moved in an opposite direction and upwardly towards the tool 13 until the end surface 51 of the measuring member 50 abuts against the lower facing end side of the tool 13. In this condition the measuring member 50 is moved at least insignificantly further upwardly. This movement of the measuring member 50 is controlled by a not shown software of a computer system. Starting from the position of the contact piece 25 and the optical measuring system 40, the required adjustment position for the lower measuring member 50, in particular its end surface 51, is calculated, as required for the nominal abutment position and required for shrinking of the tool 13 to the nominal value. The calculated position for the measuring member 50 is then adjusted by displacing of the measuring member 50. This condition is shown in FIG. 5d. Finally, the tool 13 is shrunk in the tool receptacle 10. During the warming of the tool receptacle 10, the tool 13 falls downwardly into the opening 11, until its end side abuts against the end side 51 of the measuring member 50 and its nominal position is reached. Thereafter the cooling of the tool receptacle 10 is performed.

It will be understood that each of the elements described above, or two or more together, may also find a useful application in other types of methods differing from the types described above.

While the invention has been illustrated and described as embodied in method for force-transmitting clamping of a tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of setting a desired axial insertion depth of a shaft of a tool in an opening of a tool receptacle in preparation for force-transmitting clamping of the tool within the tool receptacle by shrink-fitting with heating and cooling, the method comprising the steps of inserting the shaft of the tool into a support opening of a support, the support opening being coaxially centered to an insertion end of the opening of the tool receptacle; keeping the tool receptacle in an unheated condition; placing a movable holder with a contact piece on an end of the tool; adjusting the position of the contact piece such that an end thereof abuts the end of the tool; contacting an opposite end of the tool with an abutment end surface of a measuring member from a direction opposite to an insertion direction of the tool in the opening of the tool receptacle; calculating the desired axial insertion depth of the shaft of the tool based on a measured distance between the contact piece of the movable holder and the abutment end surface of the measuring member; and retracting the measuring member within the tool receptacle to the position corresponding to the calculated axial insertion depth of the shaft.

2. The method as defined in claim 1; and further comprising activating the clamping of the tool by heating of the tool receptacle with simultaneous axial insertion of the shaft of the tool in the opening of the tool receptacle until the opposite end of the tool abuts with the abutment end surface of the measuring member; and thereafter stopping the heating of the tool receptacle.

* * * * *